(12) United States Patent
Gates

(10) Patent No.: US 8,241,379 B2
(45) Date of Patent: Aug. 14, 2012

(54) NATURAL GAS RECLAIMER DEVICE

(75) Inventor: Kraig R Gates, Rock Springs, WY (US)

(73) Assignee: PTG Industries, LLC, Rock Springs, WY (US)

( * ) Notice: Subject to any disclaimer, the term of this patent is extended or adjusted under 35 U.S.C. 154(b) by 300 days.

(21) Appl. No.: 12/762,045

(22) Filed: Apr. 16, 2010

(65) Prior Publication Data
US 2011/0094385 A1    Apr. 28, 2011

Related U.S. Application Data

(60) Provisional application No. 61/170,075, filed on Apr. 16, 2009.

(51) Int. Cl.
*B01D 45/00* (2006.01)

(52) U.S. Cl. .............. 55/442; 55/443; 55/444; 55/434; 55/385.1; 55/416; 96/400; 96/406

(58) Field of Classification Search ........... 55/442, 55/443, 444, 434, 385.1, 416; 96/400, 406; 62/48.2, 636; 376/287; 118/715; 422/171
See application file for complete search history.

(56) References Cited

U.S. PATENT DOCUMENTS

| | | | | |
|---|---|---|---|---|
| 2,258,015 | A * | 10/1941 | Keith, Jr. et al. | 62/636 |
| 2,945,748 | A * | 7/1960 | Magill | 422/171 |
| 3,264,212 | A * | 8/1966 | King et al. | 208/340 |
| 3,324,669 | A * | 6/1967 | Cooper et al. | 62/632 |
| 3,981,156 | A | 9/1976 | Modisette et al. | |
| 4,110,996 | A | 9/1978 | Thompson | |
| 4,193,967 | A * | 3/1980 | Black | 422/170 |
| 4,350,018 | A | 9/1982 | Frank et al. | |
| 5,006,138 | A | 4/1991 | Hewitt | |
| 5,407,647 | A * | 4/1995 | Tarancon | 422/171 |
| 5,426,945 | A | 6/1995 | Menzenski | |
| 5,427,610 | A * | 6/1995 | Croker | 95/114 |
| 5,958,138 | A | 9/1999 | Tomita et al. | |
| 6,436,353 | B1 | 8/2002 | Ohmi et al. | |
| 6,440,379 | B1 * | 8/2002 | Verrill et al. | 423/243.01 |
| 6,562,304 | B1 * | 5/2003 | Mizrahi | 422/171 |
| 2008/0237141 | A1 * | 10/2008 | Kerfoot | 210/739 |
| 2009/0095153 | A1 * | 4/2009 | Roper et al. | 95/11 |
| 2010/0209598 | A1 * | 8/2010 | Xu et al. | 427/124 |

* cited by examiner

*Primary Examiner* — Jason M Greene
*Assistant Examiner* — Dung H Bui
(74) *Attorney, Agent, or Firm* — Robert L. Lundstrom

(57) ABSTRACT

A natural gas reclaimer device includes a pressure vessel with an inlet port and an outlet port. A conditioner is disposed in the pressure vessel to remove contaminants and stabilize the flow of natural gas received by the inlet port and prior to releasing the natural gas from the outlet port for subsequent use.

17 Claims, 6 Drawing Sheets

NATURAL GAS RECLAIMER DEVICE

PRIORITY CLAIM

Benefit is claimed of U.S. Provisional Patent Application Ser. No. 61/170,075, filed Apr. 16, 2009 which is herein incorporated by reference in its entirety for all purposes.

BACKGROUND OF THE INVENTION

1. Field of the Invention

The present invention relates generally to devices for reclaiming natural gas used to power equipment such as a pump in a well head antifreeze system.

2. Related Art

Natural gas and oil wells in geographic areas with colder climates are susceptible to freezing around the well head. Such freezing can damage well pumps, valves, and other equipment, and cause a decrease or loss of natural gas production from the well.

To reduce freezing of the well heads, systems have been developed that pump antifreeze solutions through or around the well head equipment. Often, the pumps that circulate the antifreeze solution are driven by pressurized natural gas from the well. In these cases, a small portion of the pressurized natural gas being extracted from the well is diverted from the pipeline and fed into the antifreeze pump where the pressure from the natural gas drives the pump and circulates the antifreeze. The natural gas is released to the atmosphere after running the pumps.

Unfortunately releasing the natural gas to the atmosphere causes an adverse environmental impact and often counts against allowable emission standards set by government environmental control agencies. Additionally, the amount of gas released to the atmosphere from these pumps amounts to lost revenues from sale of the natural gas to consumers.

Reclaiming the natural gas from the pumps into the pipeline has not been a viable option because of several problems. For example, when the natural gas is used to drive the pump, contaminants can be introduced into the natural gas that make the gas unfit for further consumption. For instance, the pumps used to circulate the antifreeze can develop leaks in the seals separating the antifreeze lines from the natural gas lines. When this occurs, antifreeze can enter the natural gas line and mix with the natural gas. The antifreeze makes the natural gas unfit for use.

Furthermore, occasionally an antifreeze pump will suffer a catastrophic failure such that antifreeze is dispersed from the pump in large quantities. Antifreeze is a toxic substance that can have an adverse environmental impact and any such failure requires containment and clean up which is expensive. Additionally, the natural gas well may need to be shut down during the clean up which adds lost production revenue to the total costs of clean up and repair of an antifreeze pump failure.

SUMMARY OF THE INVENTION

The inventor has recognized that it would be advantageous to develop a method and device for reclaiming the natural gas used to run equipment such as pumps in well head antifreeze systems. Additionally, the inventor has recognized that it would be advantageous to develop a method for scrubbing and/or conditioning natural gas used to run equipment prior to reclaiming the natural gas. Furthermore, the inventor has recognized that it would be advantageous to develop a method and device for containing antifreeze from a pump in a well-head antifreeze system if the pump experiences a leak or seal failure in order to minimize clean up and repair costs, as well as damage to the environment.

The invention provides generally for a natural gas reclaimer device including an inlet port configured to be fluidly coupled to a natural gas outlet of an antifreeze pump for a well head antifreeze system. A pressure vessel can be in fluid communication with the inlet port and can direct the natural gas from the inlet port to an outlet. A conditioner can be disposed in the natural gas vessel to remove contaminants from the natural gas. An outlet port can be coupled to the natural gas vessel to release natural gas from the natural gas vessel.

In accordance with another aspect of the present invention, the natural gas reclaimer can form a part of a containment system for an antifreeze pump secured to the reclaimer. In this way, if the pump leaks or fails, antifreeze solution from the pump can be contained and restricted from contaminating surrounding areas.

In accordance with another aspect of the present invention, the natural gas reclaimer device can also include a pressure relief port disposed in the pressure vessel. The pressure relief port can release pressure from the pressure vessel if pressure in the pressure vessel exceeds a predetermined threshold. Additionally, the pressure relief port can include a float valve to restrict liquid from leaving the pressure vessel if the vessel fills with liquid condensate from the conditioner.

The present invention also provides for a method for reclaiming natural gas from a pump powered by pressurized natural gas including directing pressurized natural gas from an exhaust port of the pump to an inlet port of a natural gas vessel. The natural gas can be moved through a scrubber in the natural gas vessel to condition the natural gas for reuse. The natural gas can then be released from the natural gas vessel through an outlet port.

Additional features and advantages of the invention will be apparent from the detailed description which follows, taken in conjunction with the accompanying drawings, which together illustrate, by way of example, features of the invention.

DETAILED DESCRIPTION

Figure 1:
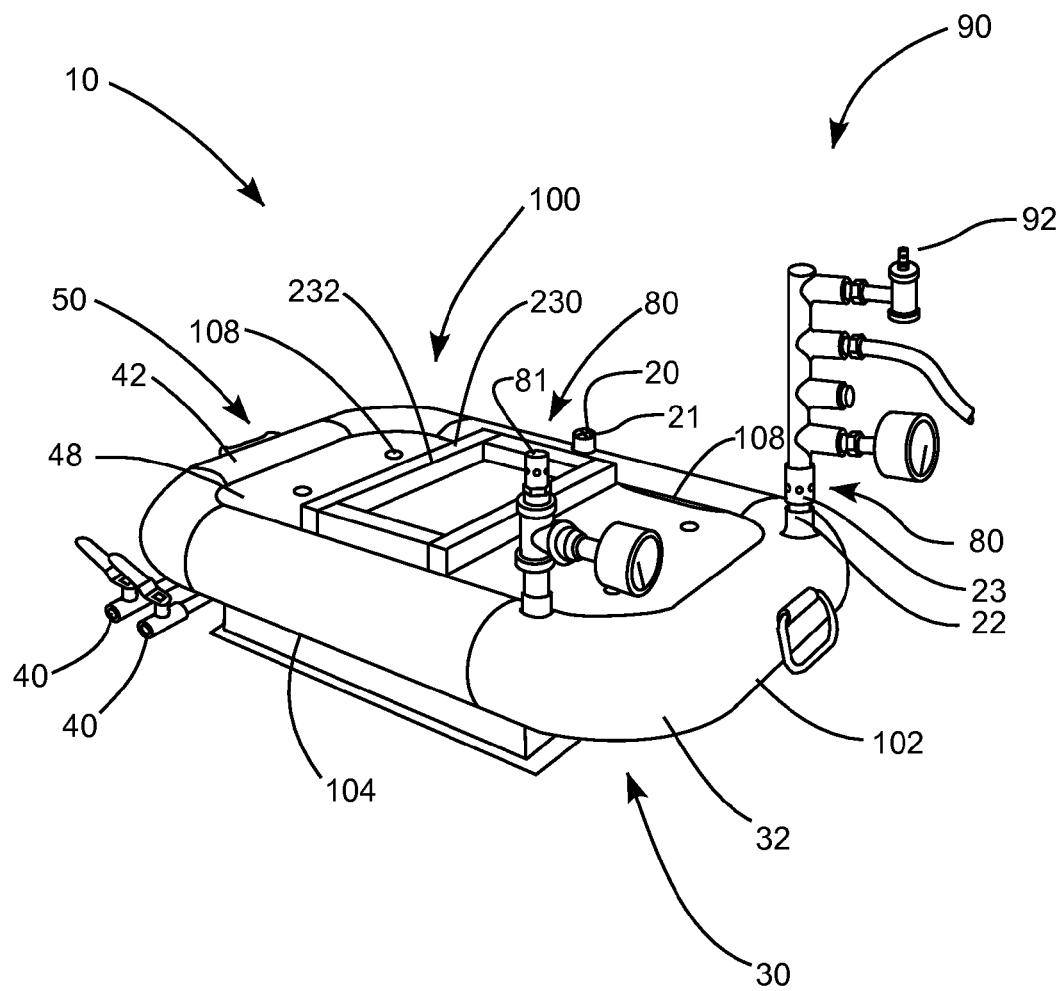
FIG. 1 is a perspective view of a natural gas reclaimer device in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

The embodiments of the present invention described herein provide generally for a natural gas reclaimer device for reclaiming pressurized natural gas used to power, drive, or run equipment commonly used at a well-head site such as a pump for an antifreeze system for an oil or natural gas well head. The reclaimer can have an inlet that can be fluidly coupled to an exhaust or outlet of the pump so that pressurized natural gas exhausted from the pump is directed into a natural gas pressure vessel through the inlet. The terms natural gas vessel and pressure vessel are used interchangeably herein and generally describe a vessel for containing or directing the flow of pressurized natural gas.

The natural gas pressure vessel can include a scrubber for conditioning the natural gas for reuse. The terms scrubber and conditioner are used interchangeably herein and generally describe a device for removing contaminants from the natural gas used to drive the equipment. The scrubber or conditioner can include a plurality of baffles that form a torturous, circuitous path for the natural gas to travel through the pressure vessel. The path formed by the baffles can cause condensation of contaminants in the natural gas such as water, oil, or antifreeze vapor that may have mixed with the natural gas in the equipment's process. The natural gas vessel can also have an outlet for releasing the re-conditioned natural gas for reuse in other downstream natural gas systems.

As illustrated in FIGS. 1-4, a natural gas reclaimer device, indicated generally at 10, is shown in accordance with an embodiment of the present invention for use in reclaiming pressurized natural gas from equipment commonly used at a well head such as a pump 6 (FIG. 6) associated with an antifreeze system (not shown) for an oil or natural gas wellhead (not shown). The natural gas reclaimer device 10 includes an inlet port 20, a pressure vessel, indicated generally at 30, a conditioner, indicated generally at 50, disposed in the natural gas vessel (FIGS. 2 and 4), and an outlet port 22 for releasing natural gas from the natural gas vessel.

The inlet port 20 can be coupled to the natural gas vessel 30 and can be configured to be fluidly coupled to a natural gas outlet such as the exhaust port 8 (FIG. 6) of the pump 6 (FIG. 6) of the wellhead antifreeze system. In one aspect, the inlet port 20 may include a one way valve 21, such as a check valve or other one-way valve as known in the art. The one way valve can be opened by pressurized natural gas exhausting from the pump such that the natural gas can move from the exhaust of the pump into the natural gas vessel. Since the valve is a one way valve, gas from inside the natural gas vessel cannot feed back out of the pressure vessel through the inlet port. In another aspect, the inlet port can be a free flow port to facilitate fluid flow from the equipment. The outlet port 22 can be similar to the inlet port 20 and may also include a valve 23.

The pressure vessel 30 can be in fluid communication with the inlet port 20 to receive pressurized natural gas from the equipment through the inlet port. The pressure vessel can direct the natural gas from the inlet port 20, through the vessel 30, and to the outlet port 22. Additionally, the pressure vessel can include a drain port 40 in the bottom of the natural gas vessel to drain liquid and condensed moisture from the vessel.

In one embodiment, the pressure vessel 30 can be formed of steel tube 32 and can have a rectangular shape defining a substantially continuous flow path through the tube. It will be appreciated that the tubing defining the rectangular shape of the natural gas vessel can form other shapes such as a square, circle, or linear end-to-end pathway, among other shapes known in the art.

A block 26 (FIGS. 2-3) can be placed in the tube 32 between the inlet port 20 and the outlet port 22. The block can restrict movement of gas from the outlet port to the inlet port and can direct the flow of gas from the inlet port to the outlet port.

Figure 5:
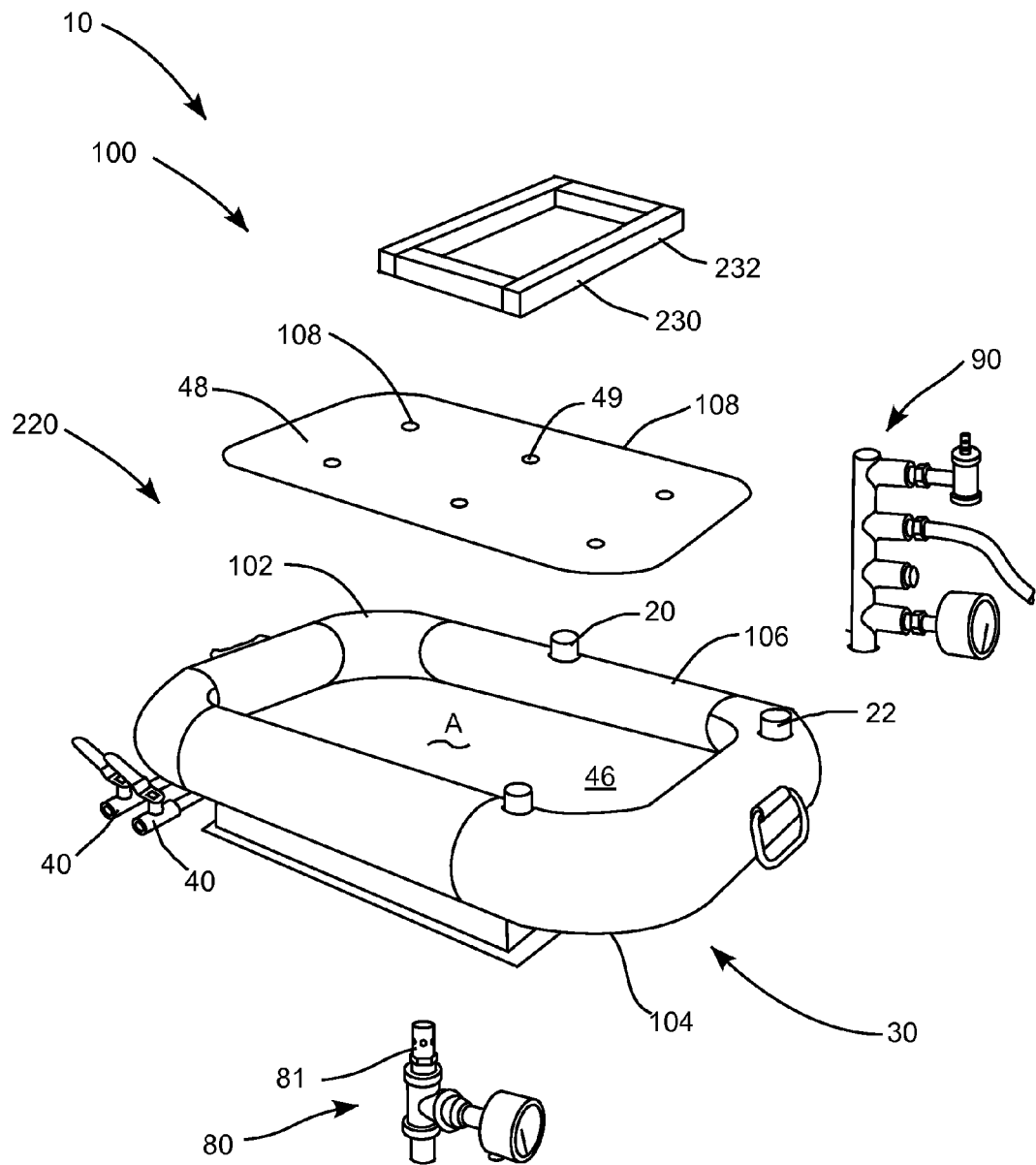
FIG. 5 is an exploded perspective view of a natural gas reclaimer and antifreeze containment system in accordance with another embodiment of the present invention.
Figure 6:
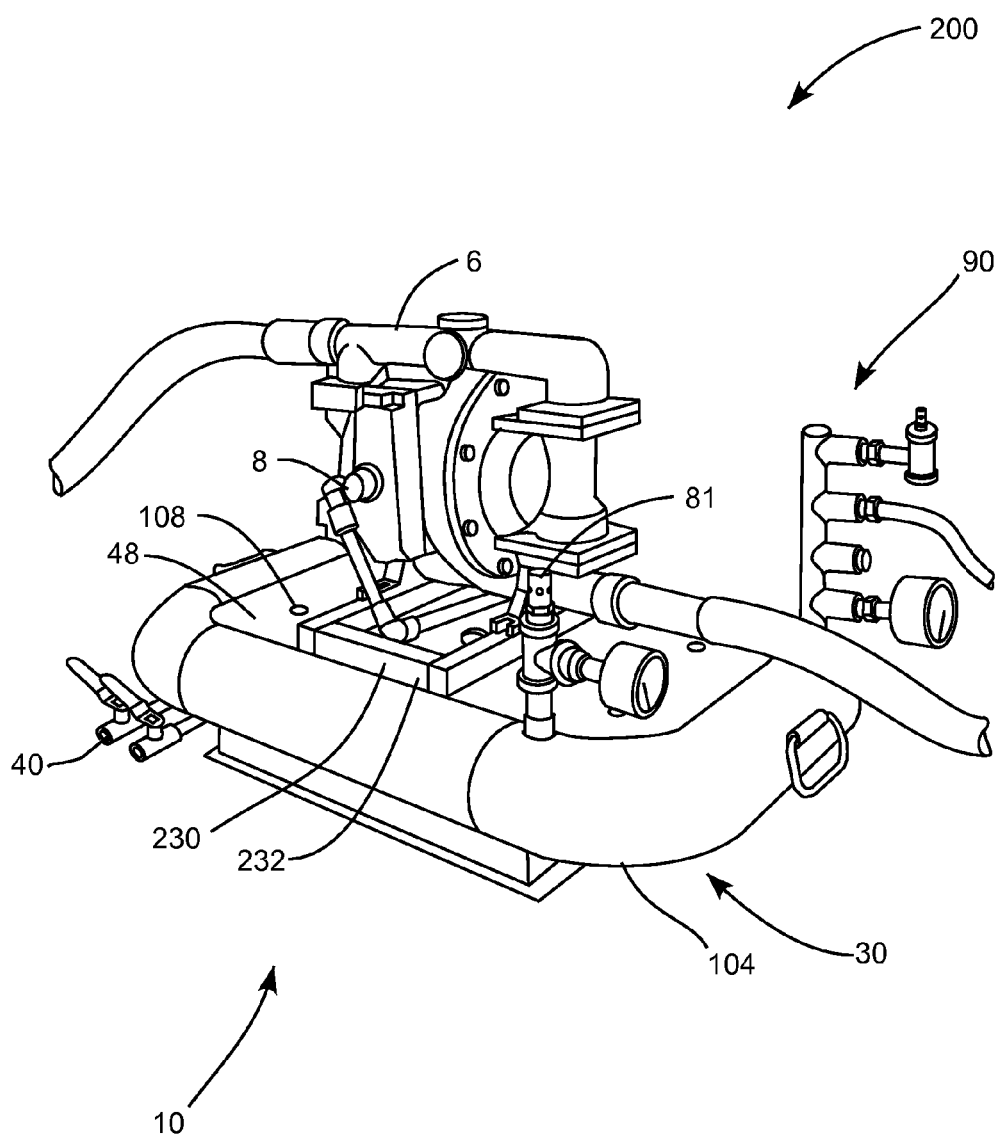
FIG. 6 is a perspective view of the natural gas reclaimer and antifreeze containment system of FIG. 6.

The pressure vessel 30 can be formed from a variety of materials. For example, in one aspect, the natural gas vessel can be formed from metal tubing, steel tubing, PVC tubing, plastic pipe, and polymer pipe. In another aspect, as shown in FIGS. 1 and 5-6, the natural gas vessel can be formed from 4 inch outer diameter steel pipe 32 with $\frac{1}{8}^{th}$ inch thick walls. Other suitable materials for handling natural gas, as known in the art, can also be used to form the natural gas vessel, as can combinations of the materials described herein.

Together the inlet port 20 and the pressure vessel 30 are an example of one means for receiving natural gas from equipment powered by pressurized natural gas.

Returning to FIGS. 1-4, the pressure vessel 30 can also include a float valve relief port, indicated generally at 80, disposed in the vessel wall 42. The float valve relief port can release natural gas from the pressure vessel if pressure in the natural gas vessel exceeds a predetermined threshold. Additionally, the relief port can restrict liquid from leaving the natural gas vessel if the pressure vessel fills with liquid. In this way, the relief port can allow the vessel to vent gas if the vessel becomes over-pressurized, but can also keep antifreeze or other harmful liquid contaminants from escaping the vessel if the pump fails and floods the vessel with antifreeze fluid, or if the vessel fills with condensation. Additionally, the float valve relief port can stall the equipment if the pressure vessel fills with liquid so as to reduce the likelihood of an environmentally unsafe leak or spill caused by continued use of the equipment after the vessel is filled.

Figure 7:
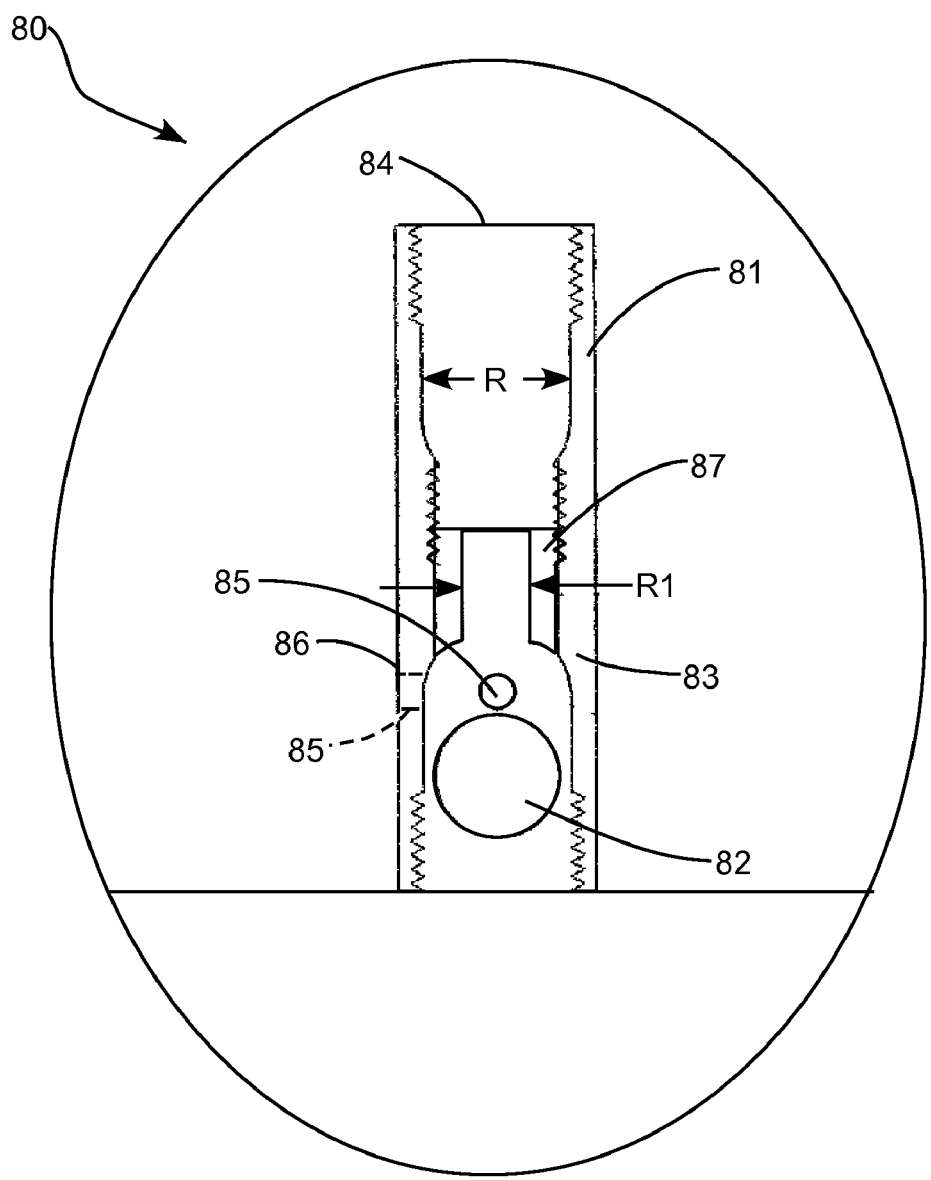
FIG. 7 is a cut away view of a pressure relieve float valve of the natural gas reclaimer device of FIG. 1.

In an embodiment shown in FIG. 7, the float valve relief port 80 can include a float check valve 81. The float check valve can have a ball float 82 that is heavy enough to remain in an open position when the vessel is filled with natural gas. However, in the event the pressure vessel 30 becomes filled with liquid, such as if the conditioner 50 condensed enough liquid from the natural gas flowing through the vessel so as to fill the vessel, then the ball float can float upward in the valve to close the port opening 84 to restrict release of the liquid in the vessel.

More specifically, the float valve 81 can include a hollow tube 83 that can be coupled to the pressure vessel 30. The hollow tube can have a narrowed portion R1 of an inner diameter R and at least one aperture 85 extending through a sidewall 86 of the tube. The narrowed portion can be part of a seat 87 that can fit inside the hollow portion. The seat 87 can be sized to receive the output line of the equipment and can be shaped to receive a ball float 82. The ball float 82 can be disposed in the hollow tube. The ball float can be sized, shaped, and positioned to float and block the narrowed portion of the inner diameter of the hollow tube as liquid rises from the pressure vessel into the hollow tube. The ball float can block the aperture(s) in the sidewall of the tube so as to restrict liquid from leaving the pressure vessel.

Advantageously, when the vessel 30 becomes full of liquid, the float check valve 81 can seal and stall the equipment to prevent further a loss of liquid from the pressure vessel. When the equipment stalls the reclaimer device can allow all downstream applications supplied by the reclaimer to return to alternate natural gas supplies so as to reduce any production loss of the well. It will also be appreciated that stalling the equipment can reduce the likelihood of external leaks and spills, thereby reducing environmental exposure.

The pressure vessel 30 can also be a part of a base, indicated generally at 100, for the equipment to rest upon. As shown in FIGS. 1-2 and 5-6, the natural gas vessel can form a perimeter 102 of the base and enclose an area, A (FIGS. 2 and 5), within the perimeter. A bottom or base plate 46 can be coupled to the bottom 104 of the vessel and can form a reservoir or containment space in the area A contained within the perimeter. A top plate 48 can be coupled to the top 106 of the vessel and can form a support surface for the pump to rest upon. When equipment such as a pump 6 is positioned on the top plate 48, the containment space A can capture any leaking fluids from the equipment and restrict the fluids from contaminating the surrounding environment. The top plate can also have apertures 108 that can allow liquids to drain into the containment space.

If needed or desired, a mounting bracket 230 can be placed on the top plate 48 to mount and secure the equipment to the vessel 30, as seen in FIGS. 1 and 6. In one aspect, the mounting bracket 230 can be a frame made from square steel tubing 232.

Returning to FIGS. 1-4, the conditioner 50 can be disposed in the pressure vessel 30 so that natural gas moving through the vessel passes through the conditioner. The conditioner in the pressure vessel can remove contaminants from the natural gas to condition or recondition the natural gas for use in subsequent downstream natural gas applications.

Figure 2:
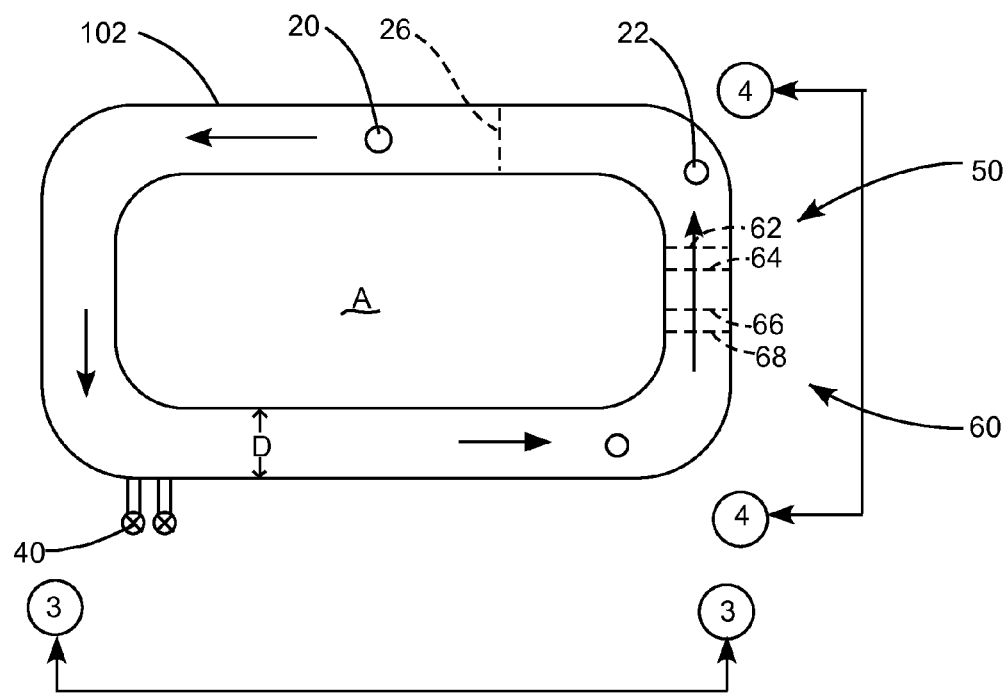
FIG. 2 is a schematic top view of the natural gas reclaimer device of FIG. 1.
Figure 3:
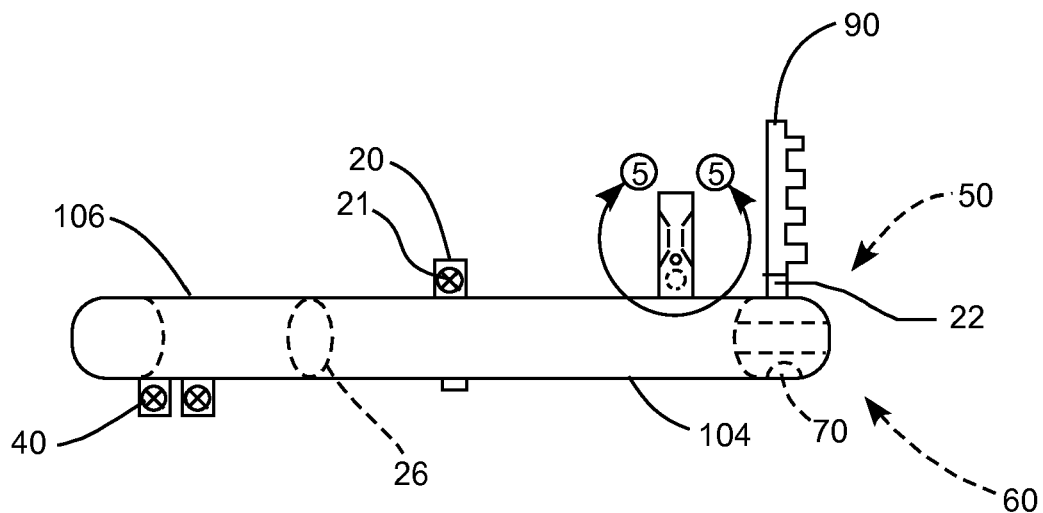
FIG. 3 is a schematic side view of the natural gas reclaimer device of FIG. 1.
Figure 4:
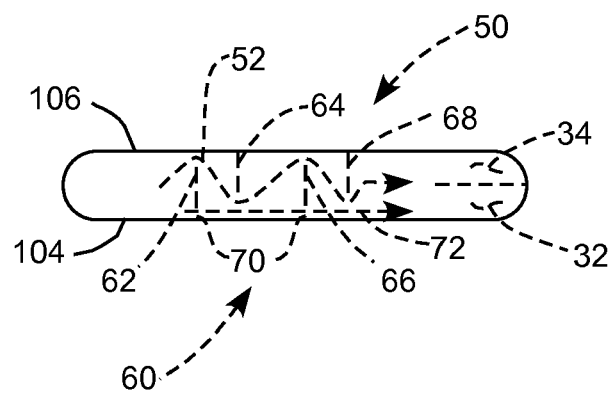
FIG. 4 is a schematic side view of the natural gas reclaimer device of FIG. 1.

In the embodiment shown in FIGS. 2-4, the conditioner 50 can include a plurality of baffles, indicated generally at 60. Each baffle can partially block a different portion of the inner diameter, D, of the pressure vessel 30. In one aspect, the baffles can be oriented at oblique angles (not shown) with respect to the flow of natural gas through the pressure vessel. In another aspect, the baffles can be oriented perpendicular to the flow of natural gas through the natural gas vessel, as shown in FIGS. 2 and 4. Advantageously, the perpendicularity of the baffles with respect to the flow of the natural gas can facilitate condensation of moisture from the natural gas and allows the condensation to run down the baffle to the bottom of the natural gas vessel.

The conditioner 50 can include four baffles 62, 64, 66, and 68 (FIGS. 2 and 4) with each baffle closing off alternating upper and lower portions of the natural gas vessel 30. The first baffle 62 can close off a lower portion 32 of the natural gas vessel 30 and allow natural gas to flow through an upper portion 34 of the natural gas vessel. The second baffle 64 can close off the upper portion 34 of the natural gas vessel and allow natural gas to flow through the lower portion 32 of the natural gas vessel. The third baffle 66 can close off the lower portion 32 of the natural gas vessel and allow natural gas to flow through the upper portion 34 of the natural gas vessel. The fourth baffle 68 can close off the upper portion 34 of the natural gas vessel and allow natural gas to flow through the lower portion 32 of the natural gas vessel.

In this way, the conditioner 50 can form a long, torturous and circuitous path, indicated by the dashed line at 52 (FIG. 4), for the natural gas in the vessel 30 to travel as the natural gas moves through the vessel from the inlet port 20 to the outlet port 22. Advantageously, the torturous circuitous path 52 formed by the plurality of baffles 60 promotes condensation of moisture and liquids out of the natural gas and into the vessel. Consequently, the first baffle 62 and the third baffle 66 can also include a drain hole 70 in the lowermost portion of the baffle to provide a flow-path, indicated by dashed line 72 (FIG. 4), for condensed liquids to drain through the vessel.

Advantageously, the baffles 60 can act to filter the natural gas and cause liquid separation from the gas so as to scrub the gas of vaporized contaminants. Additionally, it has been found that the baffles stabilize the flow of the natural gas for subsequent reuse. Hence, the natural gas delivered by the natural gas reclaimer 10 described herein is more stable and does not exhibit the pressure variations caused by the pulsations of equipment powered by the natural gas such as the pump 6.

It will be appreciated that the plurality of baffles 60 are but one way of removing moisture, or "scrubbing" the natural gas. Other moisture and contaminant removal devices and systems, as known in the art, can also be used to condition the natural gas. For example, in another aspect, a moisture removing porous filter, such as sand or steel wool (not shown), can be packed into the natural gas vessel 30 such that as the natural gas travels through the porous steel wool moisture condenses on the fibers of the steel wool and drains to the bottom of the natural gas vessel. Additionally, combinations of baffles and porous filters can be used to increase effectiveness of the conditioner 50.

The conditioner 50 is an example of one means for conditioning the natural gas by removing contaminants from the natural gas prior to releasing the natural gas for subsequent use.

Returning to FIGS. 1-4, the outlet port 22 can be coupled to the pressure vessel 30 to release natural gas from the vessel. The outlet port can include a float valve 23 configured to release natural gas from the natural gas vessel, and to restrict liquid from leaving the natural gas vessel if the natural gas vessel fills with liquid. In one aspect, the float valve 23 can be a pressure relief float valve 80 as described above to provide redundancy to the ability to vent the vessel without releasing liquid.

The reclaimer device 10 can also include a manifold, indicated generally at 90, for directing natural gas from the outlet port 22 of the natural gas vessel 30 to at least one natural gas related application. For example, the manifold can redirect natural gas from the outlet port of the vessel back to the main well pipeline (not shown) for subsequent sale to a buyer. As another example, the manifold can send the natural gas to power another natural gas powered tool (not shown), such as a secondary antifreeze pump. As yet another example, the manifold can send the natural gas to a burner 92 for consumption prior to release to the atmosphere. It will be appreciated that other applications using pressurized natural gas, as known in the art, or combinations of natural gas applications can also be accommodated by the manifold described herein.

The manifold 90 is an example of one means for directing the natural gas received by the means for receiving to a downstream application of the natural gas.

As illustrated in FIG. 5-6, a natural gas reclaimer and antifreeze containment system, indicated generally at 200, is shown in accordance with another embodiment of the present invention for use in reclaiming pressurized natural gas from a pump 6 associated with an antifreeze system (not shown) for an oil or natural gas wellhead (not shown). The natural gas reclaimer and antifreeze containment system 200 can include a natural gas reclaimer 10 described above and shown in FIGS. 1-5. The natural gas reclaimer 10 can include an inlet port 20, a pressure vessel, indicated generally at 30, a conditioner, indicated generally at 50, disposed in the natural gas vessel (FIGS. 2-4), and an outlet port 22 for releasing natural gas from the pressure vessel.

Additionally, the system 200 can include an antifreeze containment system, indicated generally at 220. The antifreeze containment system can include a base plate 46 (FIG. 7) coupled to a bottom 104 of the pressure vessel 30. Together the base plate 46 and vessel 30 can form a reservoir in the space A between the perimeter and above the base plate.

A top plate 48 can be coupled to an upper portion or top 106 of the natural gas vessel 30. The top plate can have a plurality of apertures 108 in the top plate and along an edge 49 of the top plate. The apertures can allow liquid to flow into the reservoir.

A mounting bracket 230 can be coupled to the top plate 48 and the pressure vessel 30. The mounting bracket can be configured to secure the equipment to the natural gas reclaimer 10. With the equipment coupled to the natural gas reclaimer 10, any liquid leaks from the equipment will drain into the reservoir through the apertures 108 in the top plate. In this way, possible harmful liquid chemicals, such as liquid antifreeze solutions, can be contained in the containment system 200 if the pump should leak or fail during operation.

The reservoir created in the space A between the top plate 48 and base plate 46, an enclosed by the pressure vessel 30 is an example of one means for containing liquid from the equipment if the equipment leaks during operation.

Additionally, an antifreeze pump 6 can be coupled to the mounting bracket 230. The antifreeze pump can be a heat-trace, diaphragm type pump as commonly used on natural gas or oil well heads for pumping antifreeze through and around the wellhead in order to reduce the likelihood of the wellhead freezing during cold temperature conditions.

The present invention also provides for a method for reclaiming natural gas from a pump powered by pressurized natural gas including directing pressurized natural gas from an exhaust port of the pump to an inlet port of a natural gas vessel. The natural gas can be moved through a scrubber in the natural gas vessel to condition the natural gas for reuse. The natural gas can then be released from the natural gas vessel through an outlet port.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A natural gas reclaimer device, comprising:
   a) a conditioner coupleable to a natural gas line to receive natural gas from the gas line and to remove contaminants from the natural gas prior to releasing the natural gas from the conditioner for subsequent use;
   b) a pressure vessel having an inlet port and an outlet port with the conditioner disposed in the pressure vessel to condition gas moving through the vessel from the inlet port to the outlet port; and c) the conditioner having a plurality of baffles with each baffle partially blocking a different portion of a diameter of the pressure vessel to form a circuitous path for natural gas in the vessel to travel as the natural gas moves through the vessel from the inlet port to the outlet port.

2. The device of claim 1, wherein the circuitous path formed by the plurality of baffles condenses liquids out of the natural gas in the vessel.

3. The device of claim 1, wherein the plurality of baffles includes at least four baffles with each baffle closing off alternating upper and lower portions of the pressure vessel.

4. The device of claim 3, wherein the first baffle closes off a lower portion of the pressure vessel and allows natural gas to flow through an upper portion of the pressure vessel, the second baffle closes off an upper portion of the pressure vessel and allows natural gas to flow through a lower portion of the pressure vessel, the third baffle closes off a lower portion of the pressure vessel and allows natural gas to flow through an upper portion of the pressure vessel, and the fourth baffle closes off an upper portion of the pressure vessel and allows natural gas to flow through a lower portion of the pressure vessel.

5. The device of claim 4, wherein the first and third baffle include a drain hole in the lowermost portion of the baffle to provide a path for condensed liquids to drain through the vessel.

6. The device of claim 1, further comprising a pressure relief port disposed in the pressure vessel to release pressure from the pressure vessel if pressure in the pressure vessel exceeds a predetermined threshold, and to restrict liquid from leaving the pressure vessel.

7. The device of claim 1, wherein the pressure vessel forms a base for supporting equipment.

8. The device of claim 1, wherein the pressure vessel defines a perimeter of a containment reservoir sized and shaped to contain liquids associated with equipment supported by the pressure vessel.

9. The device of claim 1, wherein the outlet port further includes a float valve that releases gas from the pressure vessel, and restricts liquid from leaving the pressure vessel.

10. The device of claim 1, further comprising a manifold for directing natural gas from the outlet port of the pressure vessel to at least one natural gas related application selected from the group consisting of returning the natural gas to a well pipeline, sending the natural gas to power a natural gas powered tool, sending the natural gas to a burner for consumption prior to release to the atmosphere, and combinations thereof.

11. The device of claim 1, further comprising a natural gas powered pump having an outlet port or exhaust port in fluid communication with the pressure vessel via the inlet port to supply the vessel with pressurized natural gas.

12. The device of claim 11, wherein the pressure vessel forms a base perimeter and further comprising:
   a) a base plate coupled to the pressure vessel to close off a lower portion of the perimeter;
   b) an upper plate coupled to the pressure vessel to close off an upper portion of the perimeter and forming a reservoir between the perimeter and the base plate and upper plate;
   c) a mounting bracket associated with the upper plate and configured to support the natural gas powered pump on top of the reservoir; and
   d) the upper plate having a plurality of apertures configured to receive liquid from the pump if the pump leaks liquid and to contain the liquid in the reservoir.

13. A natural gas reclaimer and fluid containment system for equipment powered by pressurized natural gas from an oil or natural gas well, comprising:
   a) a natural gas reclaimer device having a pressure vessel and a conditioner disposed in the pressure vessel to remove contaminants from gas moving through the vessel, the pressure vessel forming a perimeter enclosing an area therebetween;

b) a base plate and a top plate coupled to the pressure vessel and forming a reservoir with the space enclosed by the perimeter, the top plate having a plurality of apertures therethrough for receiving liquid into the reservoir; and c) a mounting bracket associated with the top plate for mounting the equipment to the natural gas reclaimer device such that if fluid leaks from the equipment the fluid falls into the reservoir through the apertures in the top plate; and d) the conditioner further comprising a plurality of baffles with each baffle partially blocking different portions of a diameter of the pressure vessel to form a circuitous path for natural gas in the vessel to travel as the natural gas moves through the vessel from an inlet port to an outlet port and the baffles being sized, shaped and positioned to condense liquid out of the natural gas traveling along the circuitous path formed by the plurality of baffles.

14. The device of claim 13, further comprising a pressure relief port disposed in the pressure vessel to release pressure from the pressure vessel if pressure in the pressure vessel exceeds a predetermined threshold, and having a float valve to restrict liquid from leaving the pressure vessel if the vessel fills with liquid condensate.

15. A natural gas reclaimer device, comprising:

a) means for receiving natural gas from equipment powered by pressurized natural gas including a pressure vessel;

b) means for conditioning the natural gas in the means for receiving to remove contaminants from the natural gas prior to releasing the natural gas for subsequent use; and c) means for blocking different portions of the pressure vessel of the means for receiving to form a circuitous path for natural gas to travel as the natural gas moves through the pressure vessel.

16. The device of claim 15, further comprising:

a) means for containing liquid from the equipment if the equipment leaks during operation.

17. The device of claim 15, further comprising:

a) means for directing the natural gas received by the means for receiving to a downstream application of the natural gas.

* * * * *